D. D. BOYCE.
Wrought-Iron Gratings.

No. 150,745. Patented May 12, 1874.

UNITED STATES PATENT OFFICE.

DANIEL D. BOYCE, OF NEW YORK, N. Y.

IMPROVEMENT IN WROUGHT-IRON GRATINGS.

Specification forming part of Letters Patent No. 150,745, dated May 12, 1874; application filed April 4, 1874.

*To all whom it may concern:*

Figure 1:
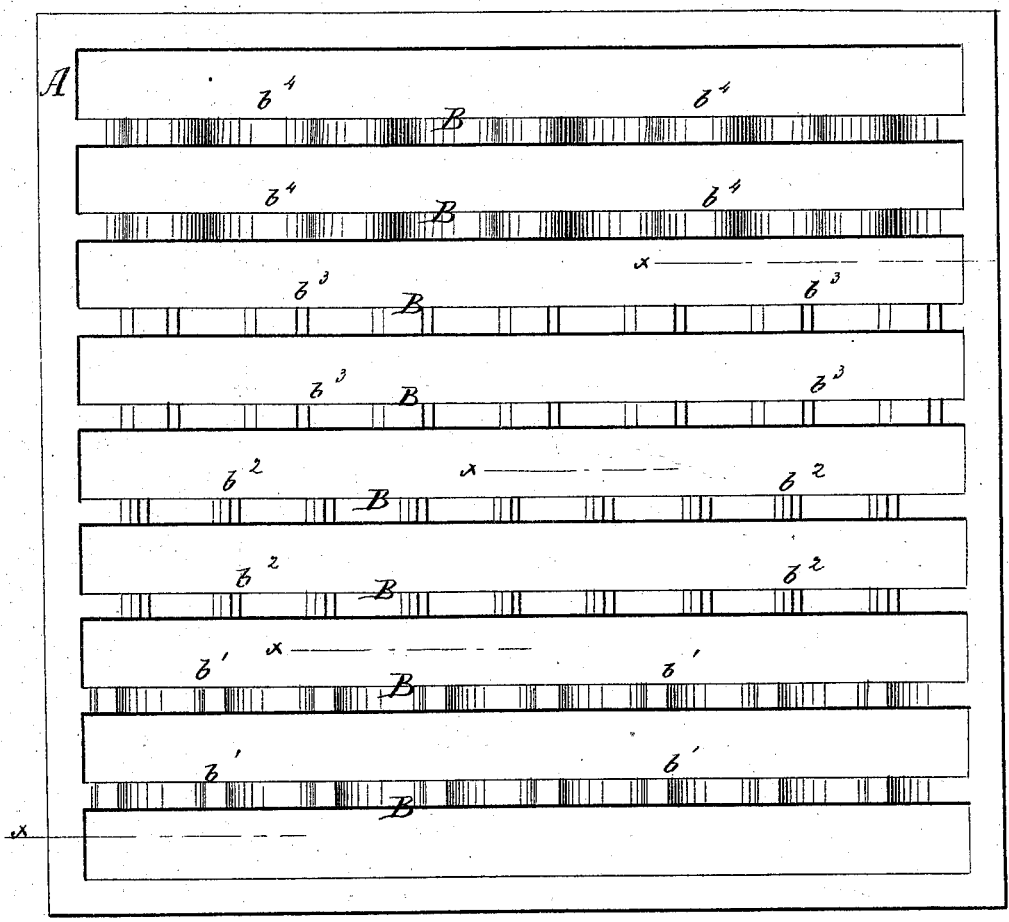
Figure 2:
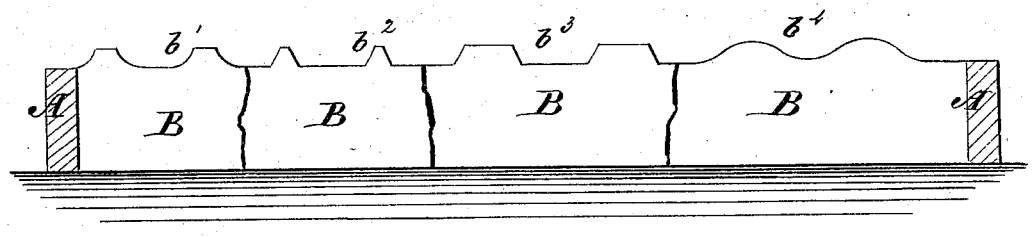

Be it known that I, DANIEL D. BOYCE, of the city, county, and State of New York, have invented a new and useful Improvement in Wrought-Iron Grating, of which the following is a specification:

Figure 1 is a top view of my improved grating, showing different forms for the bars. Fig. 2 is a detail section taken through the irregular line $x\ x\ x\ x\ x$, Fig. 1.

Similar letters of reference indicate corresponding parts.

My invention has for its object to furnish an improved grating to cover openings in the sidewalk in front of stores and other places where they will be walked upon, which shall be so constructed as to prevent people from slipping upon them. The invention consists in an improved wrought-iron grating, having the upper edges of its bars roughened by having projections and depressions formed upon them, as hereinafter fully described.

A represents the frame of the grating, and B represents the bars. The ends of the bars B have square tenons formed upon them, which are inserted in square holes in the frame A, and are riveted in the ordinary manner. The upper edges of the bars B are roughened, or have projections and depressions formed upon them, as shown in Figs. 1 and 2. These projections may be made with narrow flat tops, and with the spaces or depressions between them concaved, as shown at $b^1$, or with flat spaces between them, as shown at $b^2$; or the tops of the projections may be made wider, and with flat spaces between them, as shown at $b^3$; or the tops of the projections may be rounded and the spaces between them concaved, as shown at $b^4$; or they may be made in other forms, the form being immaterial so long as it is made in such a way as to prevent the feet of the person walking upon them from slipping.

This construction of the grating will prevent the necessity of winding the bars of the grating with cords, or covering them with boards in winter to prevent those walking upon them from slipping and falling.

Having thus described my invention, I claim as new and desire to secure by Letters Patent—

An improved wrought-iron grating, having the upper edges of its bars B roughened by projections and depressions formed in them, substantially as herein shown and described.

DANIEL D. BOYCE.

Witnesses:
  JAMES T. GRAHAM,
  T. B. MOSHER.